US011815387B2

(12) United States Patent
Burkey et al.

(10) Patent No.: US 11,815,387 B2
(45) Date of Patent: Nov. 14, 2023

(54) SYSTEM AND METHOD FOR LIQUID LEVEL MONITORING

(71) Applicant: REALMFIVE, Inc., Lincoln, NE (US)

(72) Inventors: Brant Burkey, Denton, NE (US); Steve R. Tippery, Gretna, NE (US); Tim Adkins, Plattsmouth, NE (US)

(73) Assignee: REALMFIVE, INC., Lincoln, NE (US)

( * ) Notice: Subject to any disclaimer, the term of this patent is extended or adjusted under 35 U.S.C. 154(b) by 99 days.

(21) Appl. No.: 16/936,304

(22) Filed: Jul. 22, 2020

(65) Prior Publication Data

US 2021/0025747 A1   Jan. 28, 2021

Related U.S. Application Data

(60) Provisional application No. 62/877,092, filed on Jul. 22, 2019.

(51) Int. Cl.
*G01F 23/80* (2022.01)
*G01F 23/2965* (2022.01)

(52) U.S. Cl.
CPC ........ *G01F 23/804* (2022.01); *G01F 23/2965* (2013.01)

(58) Field of Classification Search
CPC .................................. G01F 23/64; G01F 23/76
See application file for complete search history.

(56) References Cited

U.S. PATENT DOCUMENTS

| 5,646,857 | A | * | 7/1997 | McBurney | ............... | G01C 5/00 |
| | | | | | | 701/489 |
| 10,067,507 | B2 | | 9/2018 | Davoodi et al. | | |
| 2017/0023394 | A1 | * | 1/2017 | Akbar | .................. | B64C 39/024 |

FOREIGN PATENT DOCUMENTS

| WO | 2017196510 A1 | 11/2017 | | |
| WO | WO-2017196510 A1 | * | 11/2017 | ............. G01S 19/09 |

OTHER PUBLICATIONS

Cheng, KC. "Analysis of water level measurements using GPS"; Geodetic Science and Surveying Department of ecological Sciences, The Ohio University, Report No. 476; Publication (online], Nov. 2005. pp 1-111 (Year: 2005).*
Cheng, KC. "Analysis of water level measurements using GPS"; Geodetic Science and Surveying Department of Geological Sciences, The Ohio University, Report No. 476; Publication (online). Nov. 2005 [retrieved Sep. 14, 2020], Retrieved from the Internet: ; pp. 1-111.
PCT International Search Report and Written Opinion for International Application No. PCT/US2020/43150 dated Nov. 4, 2020, 10 pages.
International Preliminary Report on Patentability in International Application No. PCT/US2020/043150 dated Jan. 25, 2022, 10 pages.

* cited by examiner

*Primary Examiner* — Paul M. West
*Assistant Examiner* — Mark A Shabman
(74) *Attorney, Agent, or Firm* — Suiter Swantz pc llo

(57) ABSTRACT

A system for liquid level monitoring is provided. The system may include one or more rovers configured for placement on a surface of a body of liquid, a base configured for fixed placement on land, and one or more processors configured to determine one or more liquid levels of the body of liquid. The system may also include a remote server communicatively coupled to one or more components of the system via a network. The system may be further configured to display data associated with the one or more liquid levels.

33 Claims, 11 Drawing Sheets

SYSTEM AND METHOD FOR LIQUID LEVEL MONITORING

CROSS-REFERENCE TO RELATED APPLICATION

The present application claims the benefit under 35 U.S.C. § 119(e) of U.S. Provisional Application Ser. No. 62/877,092, filed Jul. 22, 2019, entitled LIQUID LEVELS USING RTK CORRECTION, naming Brant Burkey, Steve R. Tippery, and Tim Adkins as inventors, which is incorporated herein by reference in the entirety.

TECHNICAL FIELD

The present invention generally relates to liquid level monitoring systems, and, more particularly, to real-time kinematics-based liquid level monitoring systems.

BACKGROUND

In a wide range of applications, from natural bodies of water, artificial reservoirs, volumes of liquid held in storage tanks, and the like, it may be desirable to determine a liquid level. Accordingly, liquid level measurement systems are sometimes used to obtain data regarding the depth of a body of liquid. These systems may be desirable when obtaining measurements of liquid level is not otherwise feasible and/or easily conducted. However, previous liquid level measurement systems have faced a number of limitations and drawbacks.

First, liquid level measurement systems typically require a sensor (e.g., a radar sensor, a sonar sensor, or an ultrasonic sensor) that is configured to measure one or more depths of the body of liquid. When these sensors are not placed directly above a surface of the body of liquid, it is difficult for the sensors to detect a reflected signal off of the surface of the body of liquid. In alternative embodiments, the sensors are suspended directly above the surface of the body of liquid. However, the size and location of the body of liquid may render suspension of the sensors difficult and/or impossible.

Second, some liquid level measurement systems rely on direct contact with the liquid in order to measure some characteristic of the body of liquid. Often, these systems must be installed at or near the lowest level of the body of liquid. Depending on the topography of the body of liquid (e.g., a pond, lake, lagoon, canal, stream, river, and the like), the lowest level of the body of liquid may vary significantly across portions of the body of liquid. Additionally, the properties of the body of liquid may render direct contact measurement of the liquid level infeasible. For example, some bodies of liquid may be prone to freezing in colder climates. As an additional example, some bodies of liquid may be of a viscosity or be so caustic that renders contact-based measurement difficult and/or impossible. Therefore, it would be desirable to provide a system and method which cure one or more of the shortfalls of the previous approaches identified above.

SUMMARY

A liquid level monitoring system is disclosed. In one embodiment, the liquid level monitoring system includes one or more rovers configured for placement on a surface of a body of liquid, wherein the one or more rovers comprise: a rover global positioning system unit; one or more rover communication circuits; and a rover power source. In another embodiment, the liquid level monitoring system includes a base configured for fixed placement on land, wherein the base comprises: a base global positioning system unit; one or more base communication circuits; and a base power source. In another embodiment, the liquid level monitoring system includes one or more processors configured to: receive one or more signals indicative of one or more measured altitudes of the one or more rovers; determine one or more measured altitudes of the one or more rovers; generate one or more corrected altitudes of the one or more rovers by correcting the one or more measured altitudes of the one or more rovers using an altitude measurement correction; determine one or more liquid levels based on the one or more corrected altitudes of the one or more rovers; and report the one or more liquid levels.

A rover apparatus is disclosed. In one embodiment, the rover apparatus includes a float. In another embodiment, the rover apparatus includes a control unit communicatively couplable to a base, wherein the control unit comprises: a global positioning system unit configured to receive one or more signals indicative of a measured altitude of the rover apparatus; one or more rover communication circuits; a rover power source; and one or more rover processors configured to: determine a corrected altitude of the rover apparatus; and generate one or more liquid levels based on the corrected altitude of the rover apparatus.

A method of liquid level monitoring is disclosed. In one embodiment, the method includes receiving one or more signals indicative of one or more measured altitudes of one or more rovers disposed on a surface of a body of liquid. In another embodiment, the method includes determining the one or more measured altitudes of the one or more rovers. In another embodiment, the method includes correcting the one or more measured altitudes of the one or more rovers using an altitude measurement correction to generate one or more corrected altitudes of the one or more rovers. In another embodiment, the method includes generating one or more liquid levels based on the one or more corrected altitudes of the one or more rovers. In another embodiment, the method includes reporting the one or more liquid levels.

A liquid level monitoring system is disclosed. In one embodiment, the liquid level monitoring system includes one or more rovers configured for placement on a surface of a body of liquid, wherein the one or more rovers comprise: a rover global positioning system unit; one or more rover communication circuits; a rover power source; and one or more processors configured to: receive one or more signals indicative of one or more measured altitudes of the one or more rovers; determine one or more measured altitudes of the one or more rovers; generate one or more corrected altitudes of the one or more rovers by correcting the one or more measured altitudes of the one or more rovers using an altitude measurement correction; determine one or more liquid levels based on the one or more corrected altitudes of the one or more rovers; and report the one or more liquid levels. In another embodiment, the liquid level monitoring system includes a base configured for fixed placement on land, wherein the base comprises: a base global positioning system unit; one or more base processors configured to determine an altitude measurement error and to generate the altitude measurement correction based on the altitude measurement error; one or more base communication circuits communicatively couplable with the one or more rover communication circuits, wherein the one or more base communication circuits are configured to provide the altitude measurement correction to the one or more rovers; and base power source.

A liquid level monitoring system is disclosed. In one embodiment, the liquid level monitoring system includes one or more rovers configured for placement on a surface of a body of liquid, wherein the one or more rovers comprise: a rover global positioning system unit; one or more rover processors configured to provide one or more signals indicative of one or more measured altitudes of the one or more rovers; one or more rover communication circuits; and a rover power source. In another embodiment, the liquid level monitoring system includes a base configured for fixed placement on land, wherein the base comprises: a base global positioning system unit; one or more base communication circuits communicatively couplable to the one or more rover communication circuits, and wherein the base communication circuits are configured to receive one or more signals indicative of one or more measured altitudes of the one or more rovers; a base power source; and one or more processors configured to: receive one or more signals indicative of one or more measured altitudes of the one or more rovers; determine one or more measured altitudes of the one or more rovers; generate one or more corrected altitudes of the one or more rovers by correcting the one or more measured altitudes of the one or more rovers using an altitude measurement correction; determine one or more liquid levels based on the one or more corrected altitudes of the one or more rovers; and report the one or more liquid levels.

A liquid level monitoring system is disclosed. In one embodiment, the liquid level monitoring system includes one or more rovers configured for placement on a surface of a body of liquid, wherein the one or more rovers comprise: a rover global positioning system unit; one or more rover communication circuits; one or more rover processors configured to provide one or more signals indicative of one or more measured altitudes of the one or more rovers; and a rover power source. In another embodiment, the liquid level monitoring system includes a base configured for fixed placement on land, wherein the base comprises: a base global positioning system unit; one or more base processors configured to determine an altitude measurement error and to generate an altitude measurement correction based on the altitude measurement error; one or more base communication circuits communicatively couplable with the one or more rover communication circuits, wherein the one or more base communication circuits are configured to provide the altitude measurement correction; and a base power source. In another embodiment, the liquid level monitoring system includes a remote server communicatively couplable to at least one of the one or more rover communication circuits or the one or more base communication circuits, wherein the remote server comprises one or more processors configured to: receive one or more signals indicative of one or more measured altitudes of the one or more rovers; determine one or more measured altitudes of the one or more rovers; generate one or more corrected altitudes of the one or more rovers by correcting the one or more measured altitudes of the one or more rovers using the altitude measurement correction; determine one or more liquid levels based on the one or more corrected altitudes of the one or more rovers; and report the one or more liquid levels.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Referring generally to FIGS. 1A-4, a system and method for liquid level monitoring are disclosed, in accordance with one or more embodiments of the present disclosure.

Figure 1A:
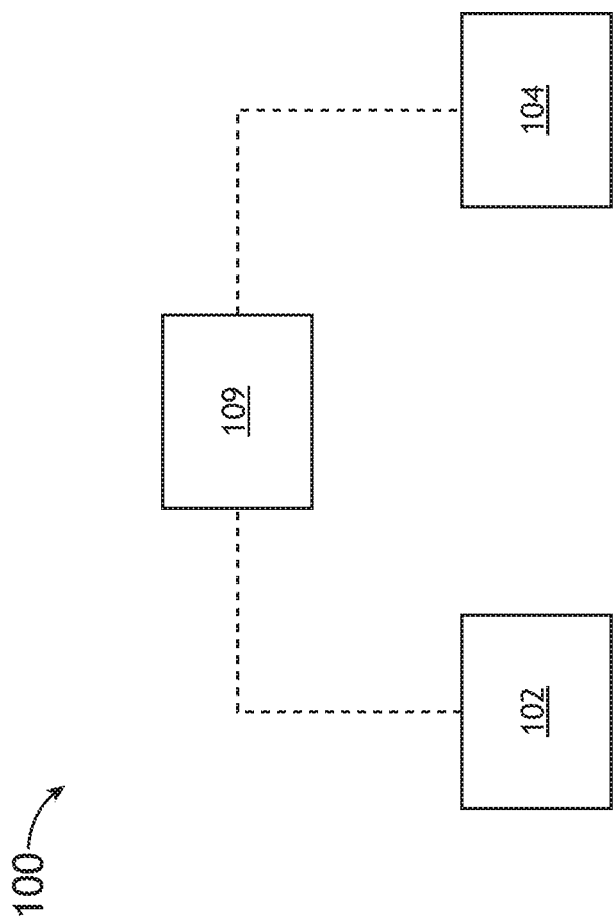
FIG. 1A illustrates a conceptual view of a liquid level monitoring system, in accordance with one or more embodiments of the present disclosure.

FIG. 1A illustrates a conceptual view of a liquid level monitoring system 100, in accordance with one or more embodiments of the present disclosure. The system 100 may include, but is not limited to, a base 102, one or more rovers 104, and one or more processors 109. The base 102 may be communicatively coupled to a remote server 105 via a network 107.

The base 102 may be configured for fixed placement on land. For example, the base 102 may be installed at a location adjacent to a body of liquid 111. By way of another example, the base 102 may be installed at a location non-adjacent to the body of liquid 111. The base 102 may comprise one or more portions of a cellular tower. For example, the base 102 may comprise a public cellular tower communicatively coupled to one or more networks (e.g., the internet). By way of another example, the base 102 may comprise one or more portions of a networked transport of RTCM via internet protocol (NTRIP) system. The base 102 may include a base global positioning system unit 108, one or more base communication circuits 110, and a base power source 112.

The one or more rovers 104 may be configured for placement on a surface of the body of liquid 111. For example, the one or more rovers 104 may be configured to float on the surface of the body of liquid 111. By way of another example, the one or more rovers 104 may be configured for installation on an existing structure located on or near the surface of the body of liquid 111 (e.g., a pump, a buoy, and the like). The one or more rovers 104 may include a rover global positioning system unit 116, one or more rover communication circuits 118, and a rover power source 120.

The base 102 may be communicatively coupled to the one or more rovers 104. For example, the one or more base communication circuits 110 may be configured to communicate with the one or more rover communication circuits 118. The one or more base communication circuits 110 may be configured to transmit and/or receive data to the one or more rovers 104 using any type of wireless communication technique known in the art including, but not limited to, radio frequency (RF) protocols, Bluetooth protocols, GSM, GPRS, DCMA, EV-DO, EDGE, WiMAX, 4G, 4G LTE, 5G, 6G, WiFi protocols, RF, LoRa, and the like.

The base 102 may be configured to store data received from the one or more rovers 104 in memory. In this regard, the base 102 may be configured to receive, store, and transmit data collected from the one or more rovers 104 (e.g., "store-and-forward"). For the purposes of the present disclosure, the base 102 may be said to function as a "repeater" and/or a "store-and-forward base" in that it may be configured to receive data from the one or more rovers 104, store the received data, and transmit the stored data to other components in the liquid level monitoring system 100.

The one or more rovers 104 may be communicatively coupled to the base 102 and/or one or more other rovers 104. For example, the one or more rover communication circuits 118 may be configured to communicate with the base 102 and/or one or more other rovers 104 via the one or more base communication circuits 110. The one or more rover communication circuits 118 may be configured to receive data from the base 102 and/or one or more other rovers 104 using any type of wireless communication technique known in the art including, but not limited to, radio frequency (RF) protocols, Bluetooth protocols, GSM, GPRS, DCMA, EV-DO, EDGE, WiMAX, 4G, 4G LTE, 5G, 6G, WiFi protocols, RF, LoRa, and the like.

The one or more rovers 104 may be configured to store data received from the base 102 and/or one or more other rovers 104 in memory. In this regard, the one or more rovers 104 may be configured to receive, store, and transmit data collected from the base 102 and/or any of the one or more rovers 104 (e.g., "store-and-forward"). For the purposes of the present disclosure, the one or more rovers 104 may be said to function as "repeaters" and/or "store-and-forward rovers" in that they may be configured to receive data from the base 102 and/or the one or more rovers 104, store the received data, and transmit the stored data to other components in the liquid level monitoring system 100.

In one embodiment, the base 102 is configured to transmit data to the remote server 105 via the network 107. The base 102 may be communicatively coupled to the server 105 via the network 107 using any wired or wireless communication technique known in the art including, but not limited to, ZigBee, SigFox, NB-IOT, radio frequency (RF) protocols, Bluetooth protocols, GSM, GPRS, DCMA, EV-DO, EDGE, WiMAX, 4G, 4G LTE, 5G, 6G, WiFi protocols, RF, LoRa, and the like. For purposes of the present disclosure, the base 102 may be communicatively coupled to the server 105 via any series of communicative connections, including, without limitation, one or more data gateways configured to communicatively couple the base 102 to the network 107.

In another embodiment, the one or more rovers 104 are configured to transmit data to the remote server 105 via the network 107. The one or more rovers 104 may be communicatively coupled to the server 105 via the network 107 using any wired or wireless communication technique known in the art including, but not limited to, ZigBee, SigFox, NB-IOT, radio frequency (RF) protocols, Bluetooth protocols, GSM, GPRS, DCMA, EV-DO, EDGE, WiMAX, 4G, 4G LTE, 5G, 6G, WiFi protocols, RF, LoRa, and the like. For purposes of the present disclosure, the one or more rovers 104 may be communicatively coupled to the server 105 via any series of communicative connections, including, without limitation, one or more data gateways configured to communicatively couple the one or more rovers 104 to the network 107.

It is contemplated herein that the server 105 may comprise a remote server configured to carry out one or more of the steps of the present disclosure. In one embodiment, server 105 may include a cloud-based computing platform including, but not limited to, Amazon Web Services (AWS). In one embodiment, the server 105 may be configured to store received data in memory. The one or more processors 109 may be further configured to execute a set of program instructions stored in memory, the program instructions configured to cause the one or more processors 109 to carry out one or more steps of the present disclosure.

It is further noted herein that the one or more components of system 100 may be communicatively coupled to the various other components of system 100 in any manner known in the art. For example, the base 102, the one or more rovers 104, the one or more processors 109, the network 107, and/or the remote server 105 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth, 3G, 4G, 4G LTE, 5G, 6G, and the like).

In one embodiment, system 100 may include a user interface communicatively coupled to the processors 109. In one embodiment, the user includes a display used to display data of the system 100 to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. In another embodiment, a user may input selections and/or instructions responsive to data displayed to the user via the user interface.

In another embodiment, the user interface may include, but is not limited to, one or more desktops, laptops, tablets, smartphones, smart watches, or the like. In one embodiment, a user may use the user interface in order to view data collected by the base 102 and/or the one or more rovers 104, generated by the one or more processors 109, or stored in memory. In another embodiment, the user interface may be configured to receive one or more input commands from a user, wherein the one or more input commands are configured to cause the one or more processors 109 to adjust one or more characteristics of system 100.

For example, one or more processors 109 may be configured to transmit one or more alerts to a user, wherein the user interface is configured to display the one or more alerts to the user via the display. For example, the one or more processors 109 may be configured to transmit one or more alerts to a user indicating a particular liquid level of the body of liquid 111. The one or more alerts generated by system 100 and displayed via display may include any alert known in the art including, without limitation, automated phone calls, text messages, emails, application notifications, banners, push notifications, and the like.

The one or more processors 109 may include one or more processors 109a, 109b, and/or 109c. In one embodiment, the one or more processors 109a may be located in a remote server 105. In at least the foregoing embodiment, at least one of the base 102 and the one or more rovers 104 may be configured to be communicatively couplable to the remote server 105 via the network 107. In at least this embodiment, the one or more processors 109a located in the remote server 105 may be configured to perform one or more processing functions of the present disclosure.

In another embodiment, the one or more processors 109 may be located in the base 102. For example, the base 102 may include the one or more processors 109b. In this regard, the one or more processors 109b may be communicatively coupled to the base global positioning system unit 108, the one or more base communication circuits 110, or the base power source 112. In at least this embodiment, the one or more processors 109b may be configured to perform one or more processing functions of the present disclosure.

In another embodiment, the one or more processors 109 may be located in at least one of the one or more rovers 104. For example, the one or more rovers 104 may include the one or more processors 109c. In this regard, the one or more processors 109c may be communicatively coupled to the rover global positioning system units 116, the one or more rover communication circuits 118, or the rover power source 120. In at least the foregoing embodiment, the one or more rovers 104 may be configured to be communicatively couplable to one or more other rovers 104. In at least this embodiment, the processors 109 be configured to perform one or more processing functions of the present disclosure.

The base global positioning system (GPS) unit 108 may be configured to receive and/or transmit GPS signals in order to determine a location (including the altitude) of the base 102. It is contemplated herein that the GPS position (e.g., GPS coordinates) may be time-stamped, saved in memory, and transmitted along with other stored data such that a user may be able to view the altitude of the base 102 via display of user interface. In another embodiment, the base GPS unit 108 may utilize real-time kinematic (RTK) positioning techniques in order to improve the accuracy of the base GPS unit 108 to sub-centimeter accuracy.

It is contemplated herein that the position/location of the base 102 may be input by a user via the user interface 120. For example, a user may manually input the GPS location and altitude of the base 102 via the user interface when the base 102 is installed or otherwise positioned at a location. In this regard, the base 102 may be configured to determine an altitude measurement error. For example, the one or more processors 109a may be configured to compare an altitude measured by the base GPS unit 108 to a reference altitude of the base 102 as provided by user input (or as determined by the base 102) in order to determine an altitude measurement error. By way of another example, the altitude measurement error may comprise the difference between the reference altitude of the base 102 and the altitude measured by the base GPS unit 108. In this regard, the one or more processors 109a may be configured to generate an altitude measurement correction that may be used to correct for the altitude measurement error. The base 102 may be configured to transmit the altitude measurement correction to the one or more rovers 104 and/or the remote server 105. The reference altitude of the base 102 may be determined using any method known in the art, including, without limitation, by reference to a reference set of geographical coordinates.

In another embodiment, the reference altitude of the base 102 may be determined by the base 102 during one or more programming processes. For example, the base GPS unit 108 may be configured to receive one or more signals indicative of the known altitude of the base 102. By way of another example, the base GPS unit 108 may be configured to receive a plurality of signals indicative of the reference altitude of the base 102 over a period of time. In this regard, the base 102 may determine the reference altitude of the base 102 with reference to the plurality of signals indicative of the reference altitude of the base 102. For example, the one or more processors 109a may be configured to calculate an average of a plurality of reference altitudes of the base determined based on the plurality of signals indicative of the reference altitude of the base 102.

The rover global positioning system (GPS) unit 116 may be configured to receive and/or transmit GPS signals in order to determine a location (including the altitude) of the one or more rovers 104. It is contemplated herein that the GPS position (e.g., GPS coordinates) may be time-stamped, saved in memory, and transmitted along with other stored data such that a user may be able to view the altitude of the one or more rovers 104 via display of user interface. In another embodiment, the base GPS unit 116 may utilize real-time kinematic (RTK) positioning techniques in order to improve the accuracy of the base GPS unit 116 to sub-centimeter accuracy.

The one or more processors 109 may be configured to execute a set of program instructions. In one embodiment, the set of program instructions may be configured to cause the one or more processors 109 to receive one or more signals indicative of one or more measured altitudes of the one or more rovers 104. For example, the one or more processors may receive from the rover GPS unit 116 one or more signals indicative of one or more measured altitudes of the one or more rovers 104.

In another embodiment, the set of program instructions may be configured to cause the one or more processors 109 to determine one or more measured altitudes of the one or more rovers 104. For example, the one or more processors 109 may determine the one or more measured altitudes of the one or more rovers 104 based on the one or more signals indicative of the one or more measured altitudes of the one or more rovers 104.

In another embodiment, the set of program instructions may be configured to cause the one or more processors 109 to correct the one or more measured altitudes of the one or more rovers using the altitude measurement correction, and to generate one or more corrected altitudes of the one or more rovers 104. For example, the one or more processors 109 may correct the one or more measured altitudes of the one or more rovers using the altitude measurement correction. The one or more processors 109 may generate one or more corrected altitudes of the one or more rovers 104 based on the corrected one or more measured altitudes.

In another embodiment, the set of program instructions may be configured to generate one or more liquid levels based on the one or more corrected altitudes of the one or more rovers. For example, the one or more processors 109 may be configured to generate the one or more liquid levels using the one or more corrected altitudes of the one or more rovers 104 and by reference to one or more known characteristics of the body of liquid 111. For example, the one or more processors 109 may be configured to associate the one or more corrected altitudes of the one or more rovers 104 with one or more dimensions (e.g., volume, width, depth, and the like) of or reference points associated with the body of liquid 111 to determine the one or more liquid levels.

In another embodiment, the set of program instructions may be configured to report the one or more liquid levels. For example, the one or more processors 109 may be configured to report the one or more liquid levels to the user interface. By way of another example, the one or more processors may be configured to alert a user of the one or more liquid levels.

Figure 1B:
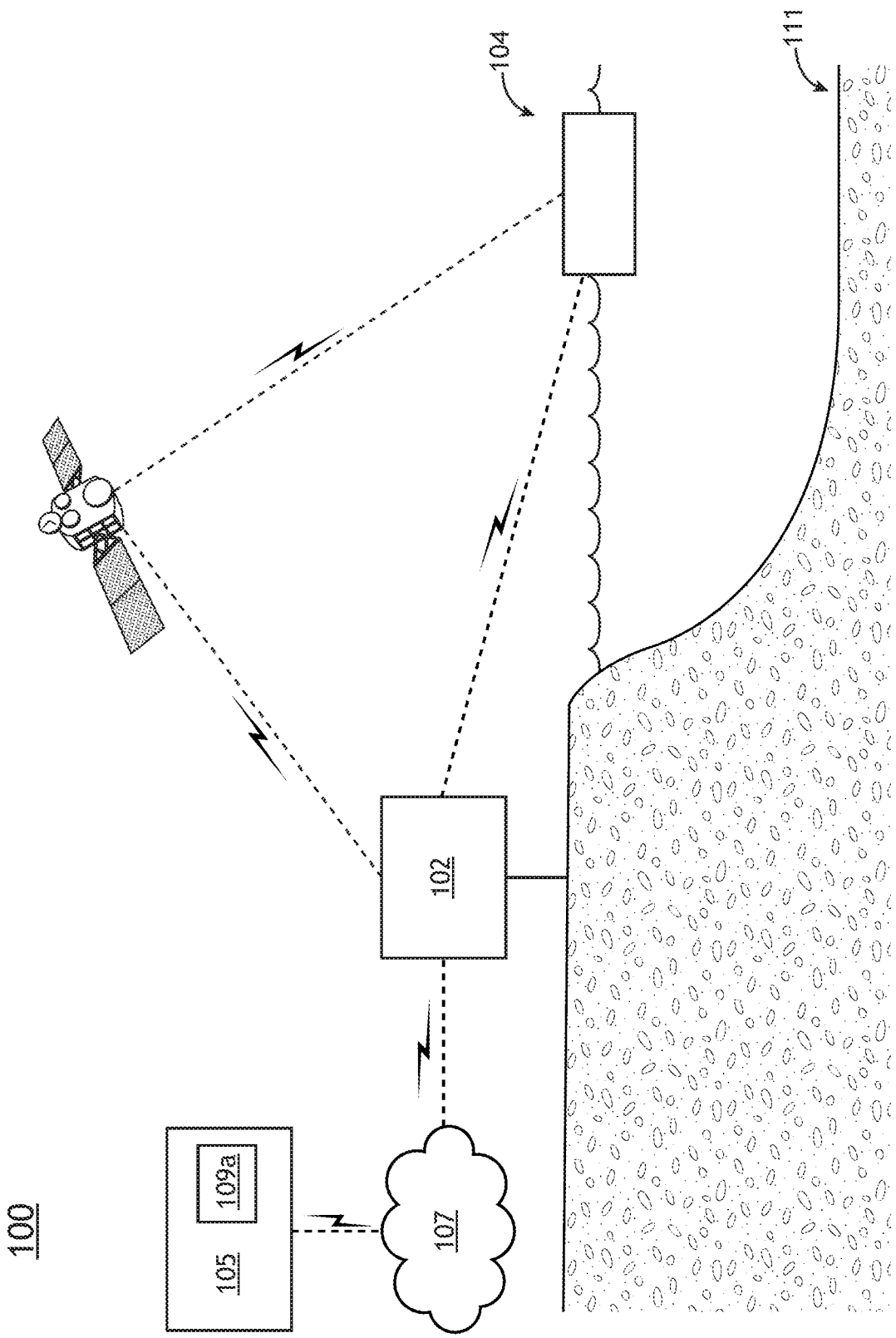
FIG. 1B illustrates a conceptual view of a liquid level monitoring system, in accordance with one or more embodiments of the present disclosure.

FIG. 1B illustrates a conceptual view of a liquid level monitoring system 100, in accordance with one or more embodiments of the present disclosure. As shown in FIG. 1B and as previously described herein, the base 102 may be communicatively coupled to a remote server 105 via a network 107. The remote server 105 may include the one or more processors 109a. The one or more rovers 104 may be configured to receive one or more signals indicative of one or more measured altitudes of the one or more rovers 104. For example, the rover GPS unit 116 may be configured to receive the one or more signals indicative of the one or more measured altitudes of the one or more rovers 104 (e.g. from one or more satellites in earth orbit).

The one or more rovers 104 may be configured to provide the one or more signals indicative of the one or more measured altitudes of the one or more rovers 104 to the remote server 105. For example, the one or more rover communication circuits 118 may transmit one or more signals indicative of the one or more measured altitudes to the base 102, and the base 102 may forward the signals to the remote server 105 via the network 107. Following the receipt by the remote server 105 of the one or more signals, the one or more processors 109a may be configured to determine the one or more measured altitudes of the one or more rovers 104 based on the one or more signals indicative of the one or more measured altitudes.

In another embodiment, the one or more rovers 104 may include one or more rover processors configured to determine the one or more measured altitudes of the one or more rovers based on the one or more signals indicative of the one or more measured altitudes. In at least the foregoing embodiment, upon determination of the one or more measured altitudes of the one or more rovers, the one or more communication circuits 118 may be configured to transmit one or more signals indicative of the determined altitudes to the base 102, and the base 102 may forward the signals to the remote server via the network 107.

Upon determination of the one or more measured altitudes of the one or more rovers 104, the one or more processors 109a may be configured to generate one or more corrected altitudes of the one or more rovers 104. For example, the one or more processors 109a may correct the one or more altitudes of the one or more rovers using the altitude measurement correction. In this regard, the base 102 may be configured to transmit one or more signals indicative of the altitude measurement correction to the remote server 105 via the network 107. In at least the foregoing example, the base 102 may include one or more base processors configured to measure an altitude of the base and compare the measured altitude of the base to the reference altitude in order to determine an altitude measurement error and an altitude correction. Alternatively, the one or more processors 109a may be configured to perform any of the foregoing processing functions related to determination of the altitude measurement error and the altitude correction. In this sense, the base 102 may be configured to transmit one or more signals to the remote server 105 via the network 107 such that the one or more processors 109a may perform the foregoing processing functions.

Upon the generation of the one or more corrected altitudes of the one or more rovers, the one or more processors 109a may be configured to generate one or more liquid levels. For example, the one or more processors 109a may be configured to correlate the one or more corrected altitudes with one or more known dimensions of the body of liquid 111 such that the one or more liquid levels may be determined.

Figure 1C:
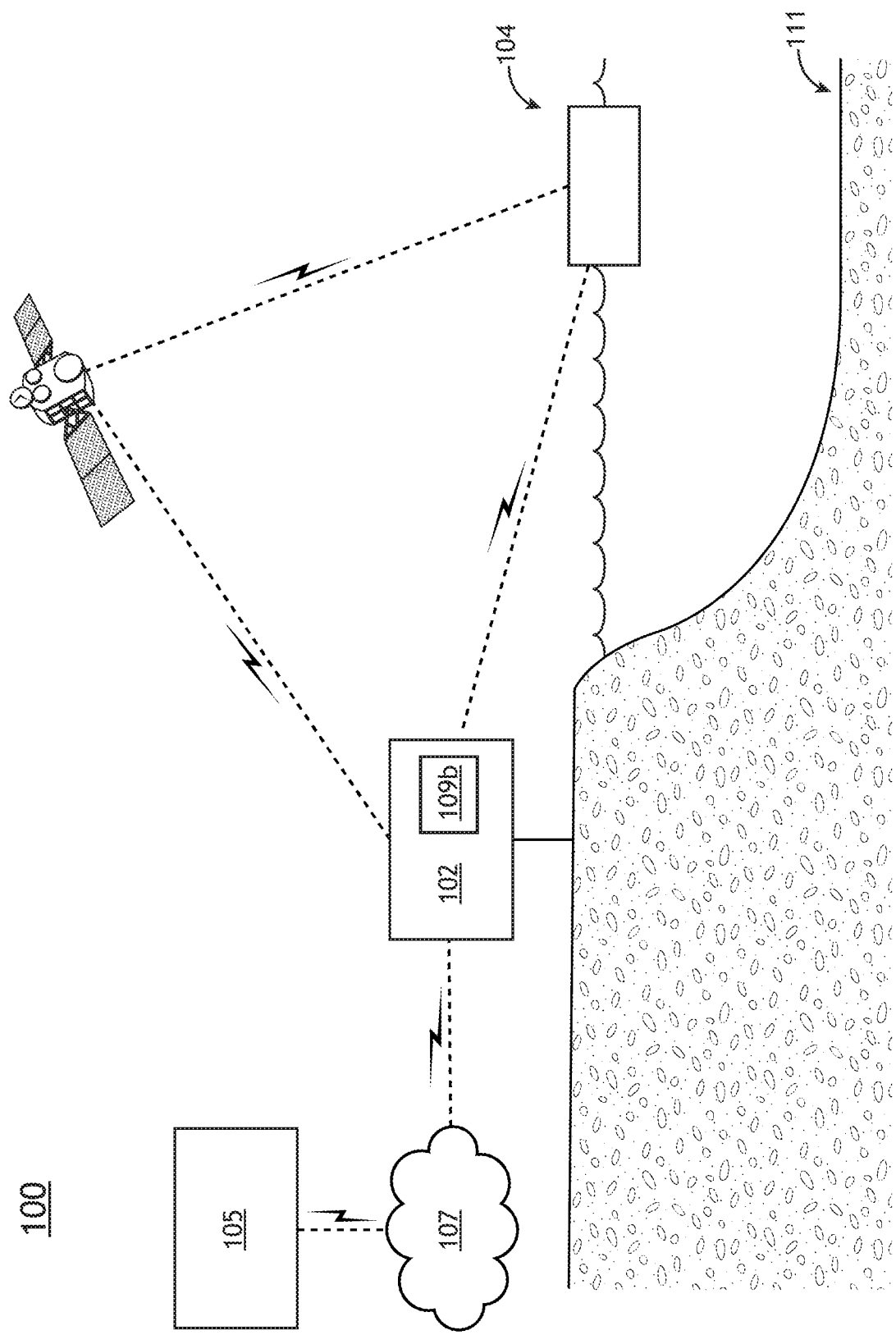
FIG. 1C illustrates a conceptual view of a liquid level monitoring system, in accordance with one or more embodiments of the present disclosure.

FIG. 1C illustrates a conceptual view of a liquid level monitoring system 100, in accordance with one or more embodiments of the present disclosure. As shown in FIG. 1C and as previously described herein, the base 102 may be communicatively coupled to a remote server 105 via a network 107. The base 102 may include one or more processors 109b. The one or more rovers 104 may be configured to receive one or more signals indicative of one or more measured altitudes of the one or more rovers 104. For example, the rover GPS unit 116 may be configured to receive the one or more signals indicative of the one or more measured altitudes of the one or more rovers 104.

The one or more rovers 104 may be configured to provide the one or more signals indicative of the one or more measured altitudes of the one or more rovers 104 to the base 102. For example, the one or more rover communication circuits 118 may transmit one or more signals indicative of the one or more measured altitudes to the base 102. Following the receipt by the base 102 of the one or more signals, the one or more processors 109b may be configured to determine the one or more measured altitudes of the one or more rovers 104 based on the one or more signals indicative of the one or more measured altitudes.

In another embodiment, the one or more rovers 104 may include one or more rover processors configured to determine the one or more measured altitudes of the one or more rovers based on the one or more signals indicative of the one or more measured altitudes. In at least the foregoing embodiment, upon determination of the one or more measured altitudes of the one or more rovers, the one or more communication circuits 118 may be configured to transmit one or more signals indicative of the determined altitudes to the base 102.

Upon determination of the one or more measured altitudes of the one or more rovers 104, the one or more processors 109b may be configured to generate one or more corrected altitudes of the one or more rovers 104. For example, the one or more processors 109b may correct the one or more altitudes of the one or more rovers 104 using the altitude measurement correction.

Upon the generation of the one or more corrected altitudes of the one or more rovers, the one or more processors 109b may be configured to generate one or more liquid levels. For example, the one or more processors 109b may be configured to correlate the one or more corrected altitudes with one or more known dimensions of the body of liquid 111 such that the one or more liquid levels may be determined.

The one or more processors 109b may be configured to report the one or more liquid levels to a user via the user interface. For example, the one or more processors 109b may display a liquid level associated with a single point in time via the display of the user interface. In another embodiment, the one or more processors 109b may be configured to alert a user of a particular liquid level.

Figure 1D:
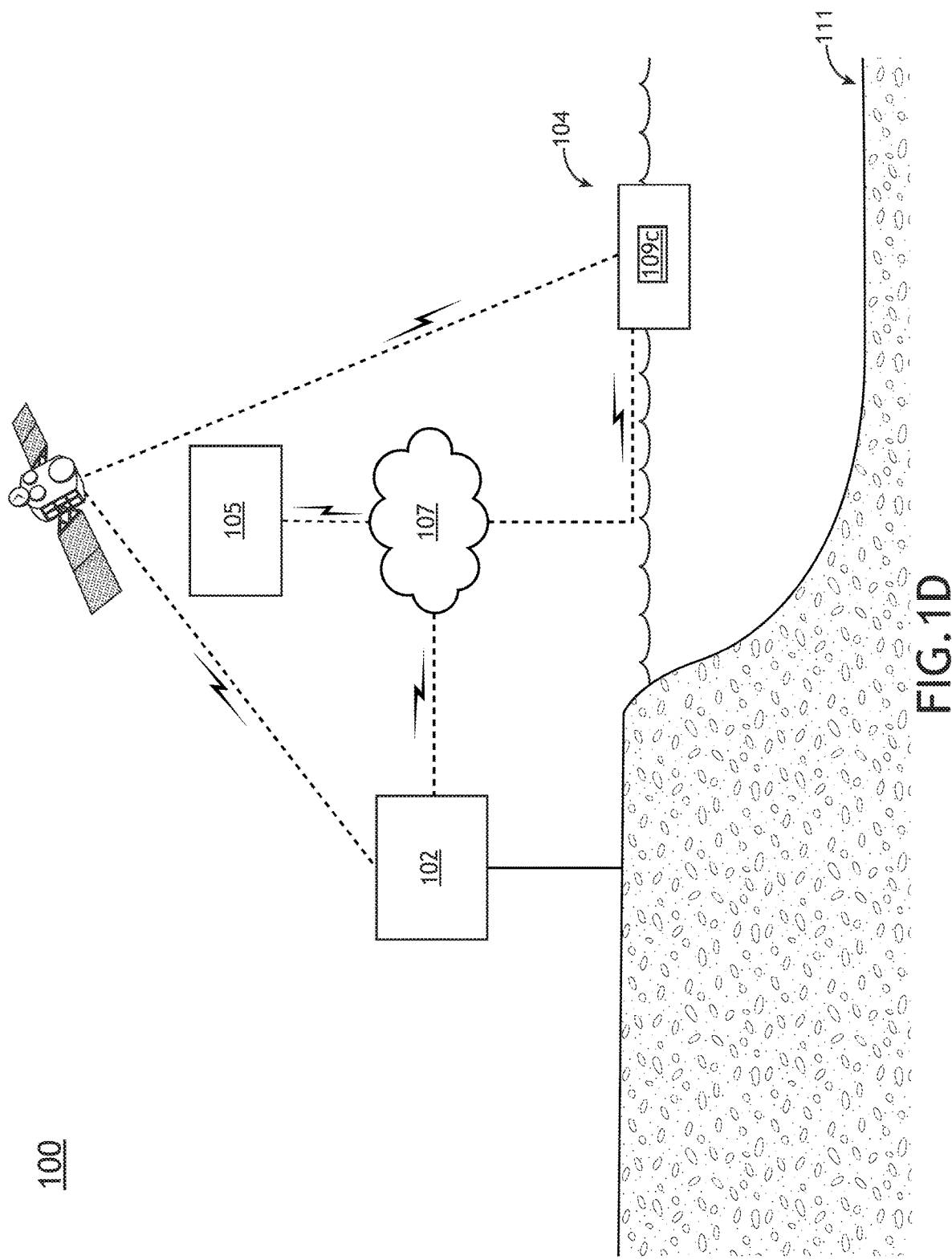
FIG. 1D illustrates a conceptual view of a liquid level monitoring system, in accordance with one or more embodiments of the present disclosure.

FIG. 1D illustrates a conceptual view of a liquid level monitoring system 100, in accordance with one or more embodiments of the present disclosure. As shown in FIG. 1D and as previously described herein, the one or more rovers 104 may include the one or more processors 109c. The one or more rovers 104 may be configured to receive one or more signals indicative of one or more measured altitudes of the one or more rovers 104. For example, the rover GPS unit 116 may be configured to receive the one or more signals indicative of the one or more measured altitudes of the one or more rovers 104.

Following the receipt by the one or more rovers 104 of the one or more signals, the one or more processors 109c may be configured to determine the one or more measured altitudes of the one or more rovers 104 based on the one or more signals indicative of the one or more measured altitudes.

Upon determination of the one or more measured altitudes of the one or more rovers 104, the one or more processors 109c may be configured to generate one or more corrected altitudes of the one or more rovers 104. For example, the one or more processors 109c may correct the one or more altitudes of the one or more rovers using the altitude measurement correction. In this regard, the base 102 may be configured to transmit one or more signals indicative of the altitude measurement correction to the one or more rovers 104. In at least the foregoing example, the base 102 may include one or more base processors configured to measure an altitude of the base and compare the measured altitude of the base to the reference altitude in order to determine an altitude measurement error and an altitude correction. In an alternative embodiment, the one or more processors 109c may be configured to receive one or more signals indicative of the altitude measurement correction from the remote server 105 via the network 107. In at least the foregoing embodiment, the remote server 105 may include one or more server processors configured to determine an altitude measurement error and an altitude correction (e.g., based on one or more signals from the base 102). Alternatively, the one or more processors 109c may be configured to perform any of the foregoing processing functions related to determination of the altitude measurement error and the altitude correction. In this sense, the base 102 and/or the remote server 105 may be configured to transmit one or more signals to the one or more rovers 104 (either directly or via the network 107) such that the one or more processors 109c may perform the foregoing processing functions.

Upon the generation of the one or more corrected altitudes of the one or more rovers, the one or more processors 109c may be configured to generate one or more liquid levels. For example, the one or more processors 109c may be configured to correlate the one or more corrected altitudes with one or more known dimensions of the body of liquid 111 such that the one or more liquid levels may be determined. By way of another example, the one or more processors 109c may be configured to report the one or more liquid levels via the remote server 105. In this regard, the one or more processors 109c may be configured to transmit one or more signals indicative of the one or more liquid levels to the remote server 105 via the network 107.

Figure 1E:
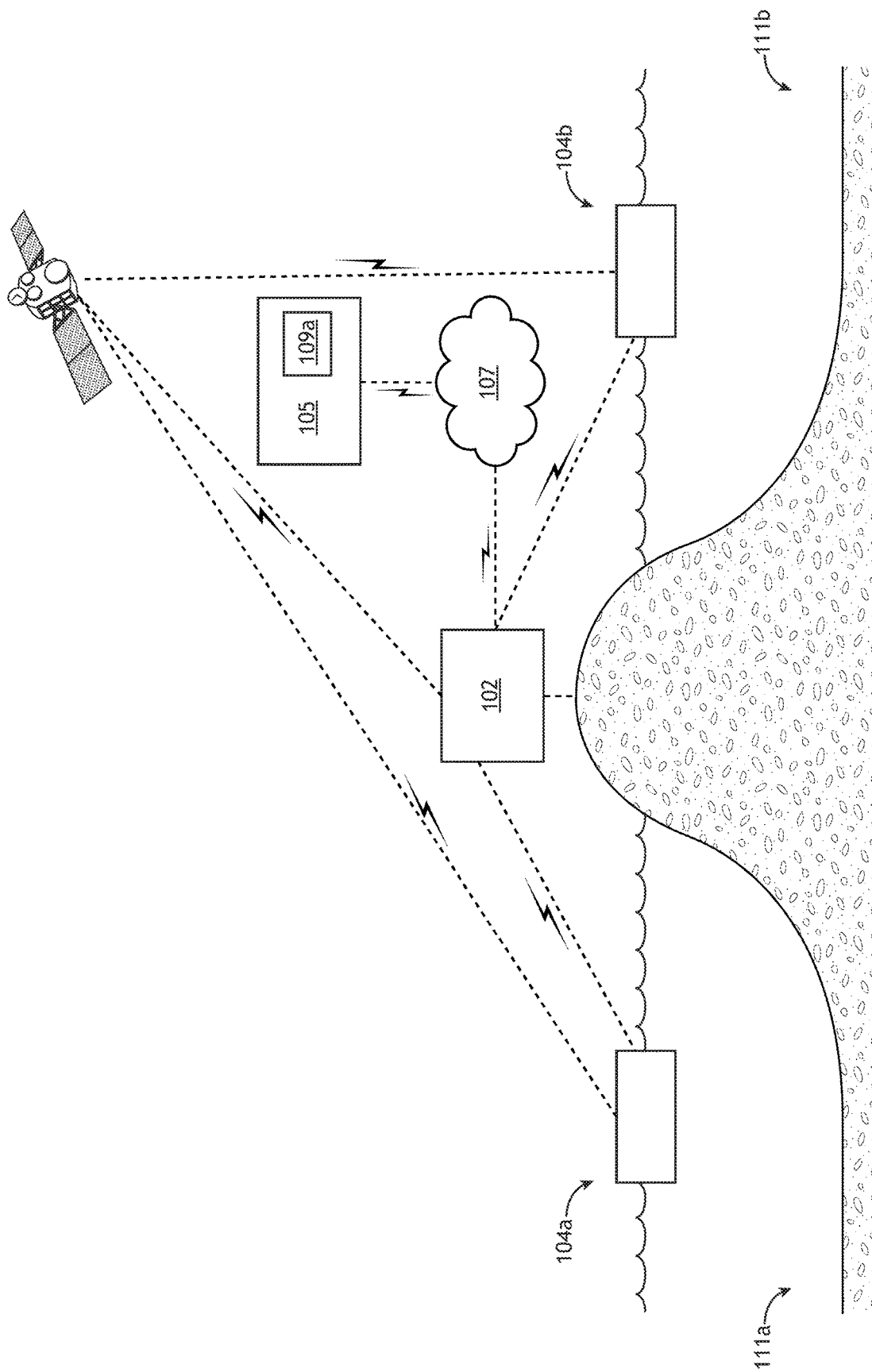
FIG. 1E illustrates a conceptual view of a liquid level monitoring system, in accordance with one or more embodiments of the present disclosure.

FIG. 1E illustrates a conceptual view of a liquid level monitoring system 100, in accordance with one or more embodiments of the present disclosure. As shown in FIG. 1E, the system 100 may include one or more rovers 104a-104b. The one or more rovers 104a-104b may be configured for placement on the surfaces of a plurality of bodies of liquid 111a-111b. The base 102 may be communicatively coupled to a remote server 105 via a network 107. The remote server 105 may include the one or more processors 109a. The one or more rovers 104a-104b may be configured to receive one or more signals indicative of one or more measured altitudes of the one or more rovers 104a-104b. For example, the rover GPS unit 116 of each of the one or more rovers 104a-104b may be configured to receive the one or more signals indicative of the one or more measured altitudes of the one or more rovers 104a-104b.

The one or more rovers 104a-104b may be configured to provide the one or more signals indicative of the one or more measured altitudes of the one or more rovers 104a-104b to the remote server 105. For example, the one or more rover communication circuits 118 may transmit one or more signals indicative of the one or more measured altitudes to the base 102, and the base 102 may forward the signals to the remote server 105 via the network 107. Following the receipt by the remote server 105 of the one or more signals, the one or more processors 109a may be configured to determine the one or more measured altitudes of the one or more rovers 104a-104b based on the one or more signals indicative of the one or more measured altitudes.

In another embodiment, the one or more rovers 104a-104b may include one or more rover processors configured to determine the one or more measured altitudes of the one or more rovers based on the one or more signals indicative of the one or more measured altitudes. In at least the foregoing embodiment, upon determination of the one or more measured altitudes of the one or more rovers, the one or more communication circuits 118 may be configured to transmit one or more signals indicative of the determined altitudes to the base 102, and the base 102 may forward the signals to the remote server via the network 107.

Upon determination of the one or more measured altitudes of the one or more rovers 104a-104b, the one or more processors 109a may be configured to generate one or more corrected altitudes of the one or more rovers 104a-104b. For example, the one or more processors 109a may correct the one or more altitudes of the one or more rovers using the altitude measurement correction. In this regard, the base 102 may be configured to transmit one or more signals indicative of the altitude measurement correction to the remote server 105 via the network 107. In at least the foregoing example, the base 102 may include one or more base processors configured to measure an altitude of the base and compare the measured altitude of the base to the reference altitude in order to determine an altitude measurement error and an altitude correction. Alternatively, the one or more processors 109a may be configured to perform any of the foregoing processing functions related to determination of the altitude measurement error and the altitude correction. In this sense, the base 102 may be configured to transmit one or more signals to the remote server 105 via the network 107 such that the one or more processors 109a may perform the foregoing processing functions.

Upon the generation of the one or more corrected altitudes of the one or more rovers, the one or more processors 109a may be configured to generate one or more liquid levels. For example, the one or more processors 109a may be configured to correlate the one or more corrected altitudes with one or more known dimensions of the bodies of liquid 111a-111b such that the one or more liquid levels may be determined.

Figure 1F:
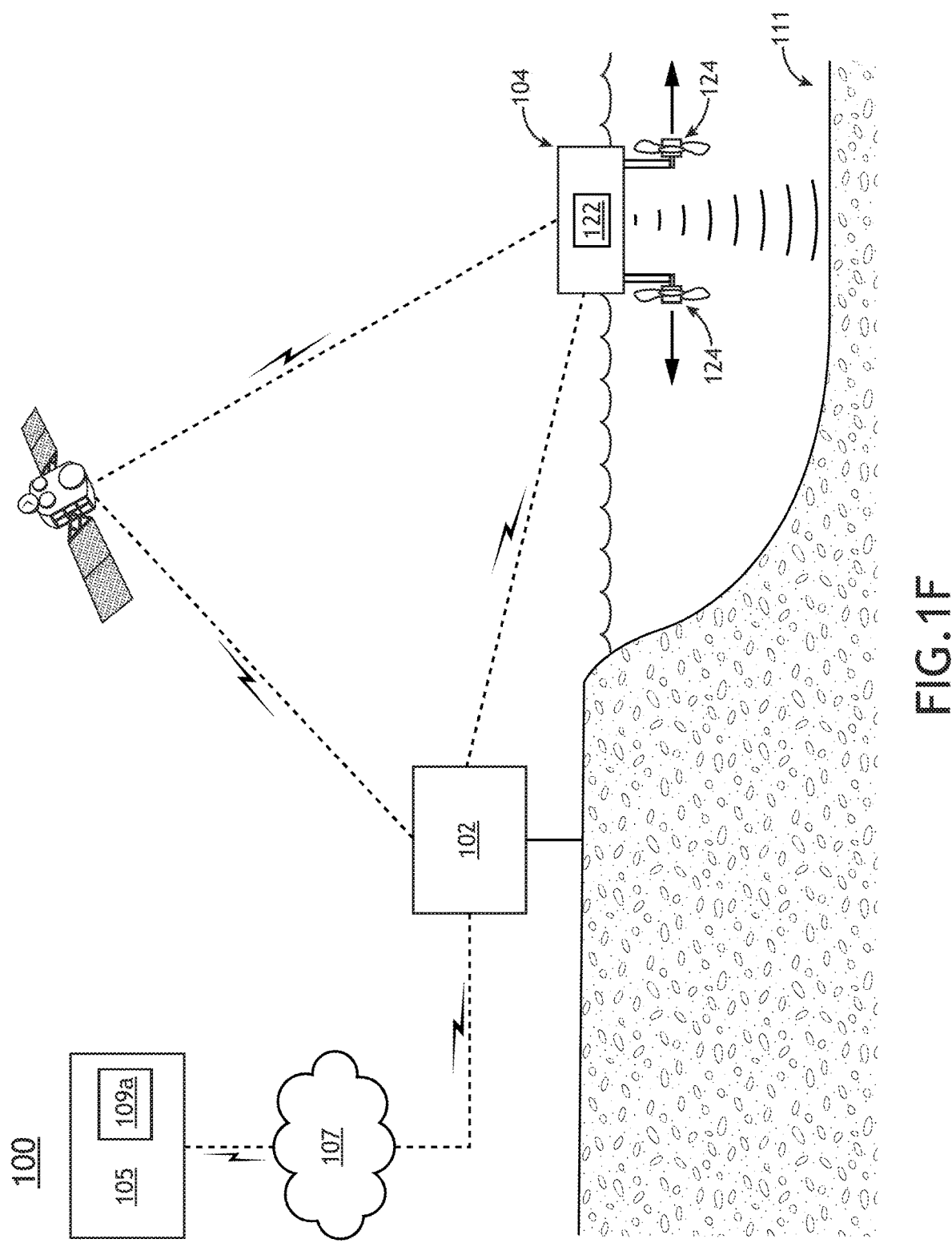
FIG. 1F illustrates a conceptual view of a liquid level monitoring system, in accordance with one or more embodiments of the present disclosure.

FIG. 1F illustrates a conceptual view of a liquid level monitoring system 100, in accordance with one or more embodiments of the present disclosure. The one or more rovers 104 may include one or more drive systems 124 configured to provide motility to the one or more rovers 104. For example, the one or more drive systems 124 may include one or more motor-driven propellers. The one or more drive systems 124 may be communicatively coupled to the one or more processors 109 such that the one or more processors may provide one or more control signals to the one or more drive systems 124. For example, the one or more processors 109a may be configured to transmit one or more control signals directing the movement of the one or more rovers 104. In this sense, the movement of the one or more rovers 104 may be directed by the one or more processors 109 based on user input via the user interface. By way of another example, the one or more processors 109a may direct the movement of the one or more rovers based on one or more conditions of the body of liquid 111 (e.g., one or more conditions that the one or more processors 109a may determine).

The one or more rovers 104 may include one or more sensor units 122 configured to measure one or more characteristics of the body of liquid 111. For example, the one or more sensor units 122 may include, but are not limited to, a radar sensor, a sonar sensor, a camera, and/or a chemical sensor (e.g., a pH sensor, a chemical composition sensor, and the like). The one or more sensor units 122 may be communicatively coupled to the one or more processors 109 such that the one or more processors 109 may determine one or more characteristics of the body of liquid 111 based on one or more signals indicative of the one or more characteristics of the body of liquid 111 measured by the one or more sensor units 122. For example, the one or more processors 109 may determine the presence of one or more objects (e.g., wildlife, people, inanimate objects, and the like) in the body of liquid 111 based on one or more signals received from the one or more sensor units 122. By way of another example, the one or more processors may determine one or more dimensions (e.g., volume, depth, width, and the like) of the body of liquid 111 based on one or more signals received from the one or more sensor units 122.

In some embodiments, the one or more sensor units 122 may be configured to measure one or more signals indicative of one or more characteristics of the environment surrounding the body of liquid 111. For example, the one or more sensor units 122 may be configured to measure one or more signals indicative of a volume of solid suspended or disposed within the body of liquid 111. By way of an additional example, the one or more sensor units 122 may be configured to measure one or more signals indicative of one or more chemical compositions of the solid suspended or disposed within the body of liquid 111. The one or more processors 109 may be configured to determine the volume and/or chemical compositions of the solid, and may be further configured to report such volume and/or chemical composition via the user interface or via an alert to a user.

The one or more processors 109 may be configured to provide one or more control signals to the one or more rovers 104, wherein the one or more control signals are configured to direct one or more aspects of the measurement by the sensor units 122. The one or more processors 109 may be configured to report the one or more characteristics of the body of liquid 111 as measured by the sensor units 122 and determined by the one or more processors 109. For example, the one or more processors 109 may report the one or more characteristics to the user interface.

Figure 1G:
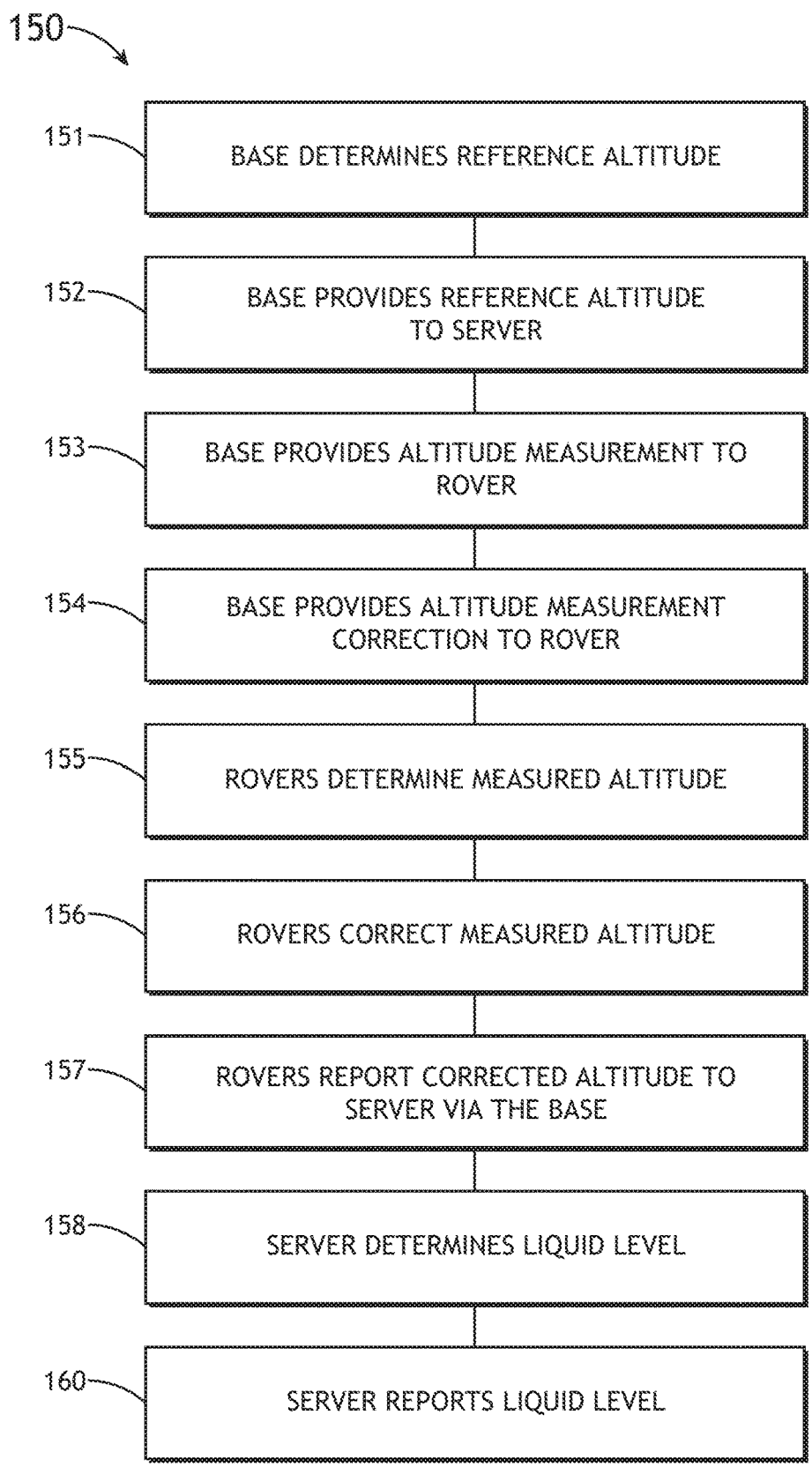
FIG. 1G illustrates a process flow diagram illustrating a sequence for liquid level monitoring, in accordance with one or more embodiments of the present disclosure.

FIG. 1G illustrates a process flow diagram illustrating a sequence 150 for liquid level monitoring, in accordance with one or more embodiments of the present disclosure. It is noted that the embodiments shown in FIG. 1G and described herein are provided as illustrative examples, and are not intended to limit the generality of the present disclosure.

In Step 151, the base 102 determines a reference altitude. For example, the reference altitude may comprise the geographical location of the base 102 (including, without limitation, an altitude of the base 102). By way of another example, the reference altitude of the base 102 may be determined by the base 102 during one or more initialization processes. For example, during the one or more initialization processes, the base GPS unit 108 may be configured to receive one or more signals indicative of the known altitude of the base 102. By way of another example, the base GPS unit 108 may be configured to receive a plurality of signals indicative of the reference altitude of the base 102 over a period of time. In this regard, the base 102 may determine the reference altitude of the base 102 with reference to the plurality of signals indicative of the reference altitude of the base 102. For example, the one or more processors 109a may be configured to calculate an average of a plurality of reference altitudes of the base determined based on the plurality of signals indicative of the reference altitude of the base 102.

In Step 152, the base 102 provides the reference altitude to the server 105. For example, the base communication circuits 110 may transmit one or more signals indicative of the reference altitude to the server 105 via the network 107.

In Step 153, the base 102 determines the altitude measurement correction. For example, the one or more processors 109 may determine the altitude measurement correction based on the altitude measurement error.

In Step 154, the base 102 provides the altitude measurement correction to the rover 104. For example, the base 102 may transmit one or more signals (e.g., via the base communication circuits 110) indicative of the altitude measurement correction to the rover 104.

In Step 155, the one or more rovers 104 determine a measured altitude of the rover 104. For example, the rover GPS unit 116 may receive one or more signals indicative of the measured altitude, and the GPS unit 116 and/or the one or more processors 109 may determine the measured altitude of the rover 104 based on the one or more signals indicative of the measured altitude.

In Step 156, the one or more rovers 104 correct the measured altitude. For example, the one or more processors 109 may correct the measured altitude using the altitude measurement correction.

In Step 157, the one or more rovers 104 report the corrected altitude to the server. For example, the one or more rovers 104 may transmit one or more signals (e.g., via the rover communication circuits 118) to the base 102, and the base 102 may transmit the corrected altitude to the server 105 via the network 107.

In Step 158, the server 105 determines the liquid level of the body of liquid 111. For example, the one or more processors 109 may correlate the corrected altitude with one or more reference points related to the depth of the body of liquid 111. The one or more reference points related to the depth of the body of liquid may be provided by a user via the user interface (e.g., the user may provide a known depth of the body of liquid, and the one or more processors 109 may associate the known depth with a reference altitude of the rover 104 at that point in time). In this regard, the one or more processors 109 may be configured to determine liquid levels at a subsequent point in time by calculating a subsequent corrected altitude of the rover 104 and by applying the difference between the two corrected altitudes to the reference points related to the depth of the body of liquid 111.

In Step 159, the server 105 reports the liquid level. For example, the server 105 may report the liquid level via the user interface.

Figure 2:
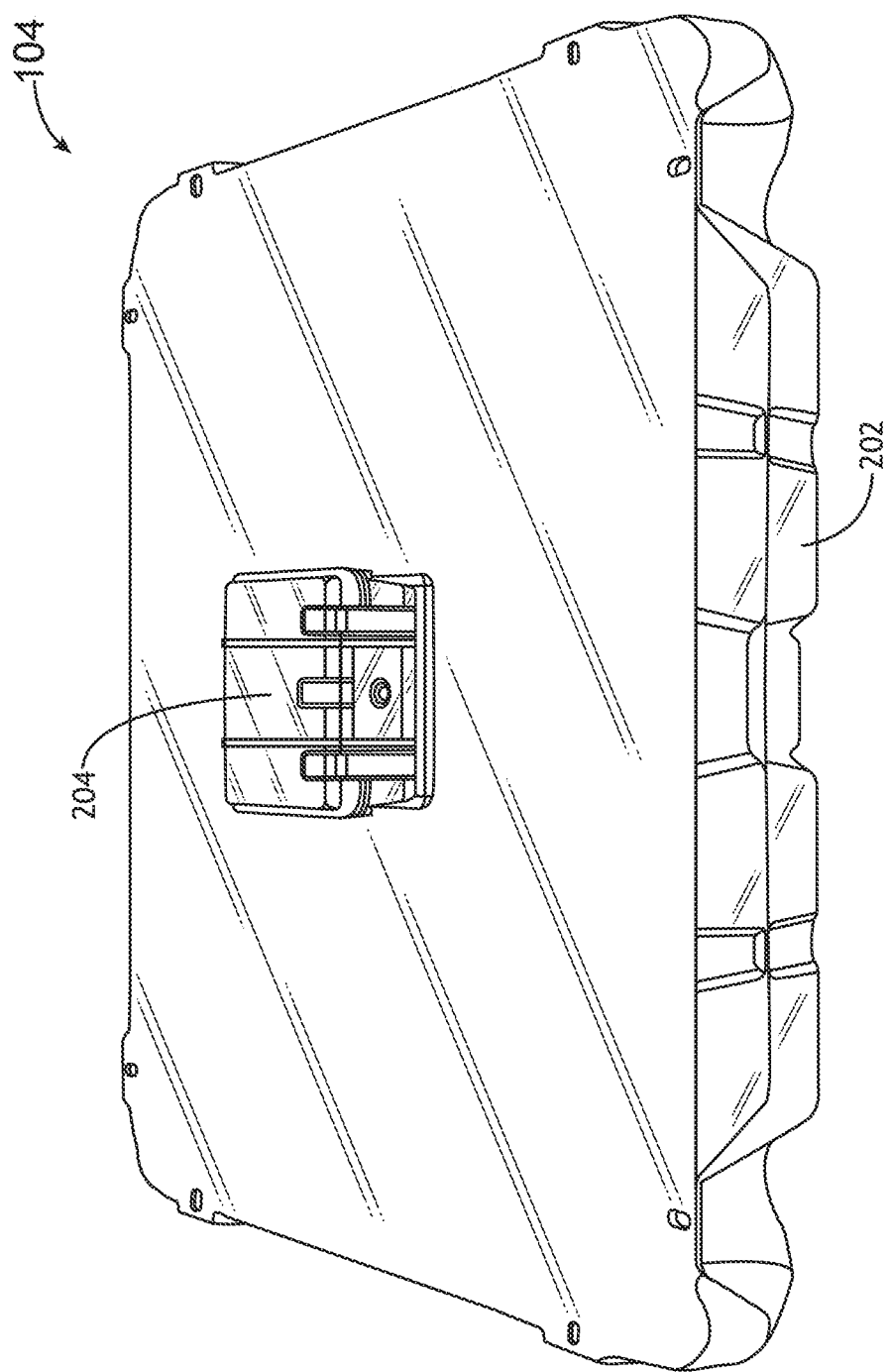
FIG. 2 illustrates a schematic view of a rover of a liquid level monitoring system, in accordance with one or more embodiments of the present disclosure.

FIG. 2 illustrates a schematic view of a rover 104 of a liquid level monitoring system 100, in accordance with one or more embodiments of the present disclosure. The rover 104 may include a float 202 configured to provide buoyancy to an enclosure 204 housing a control unit. The float 202 may include any apparatus known in the art to be suitable for the purposes contemplated herein. For example, the float 202 may include any anchored or non-anchored buoy. By way of an additional example, the float 202 may include a rotomolded buoy or floatation device.

The control unit may comprise one or more components of the one or more rovers 104. For example, the control unit may include the rover GPS unit 116, the one or more rover communication circuits 118, and/or the rower power supply 120. In some embodiments, the control unit may include one or more of the one or more processors 109. The control unit may be housed within the enclosure 204 configured to protect the control unit from damage (e.g., environmental damage). The enclosure 204 may be formed from any material known in the art to be suitable for the purposes contemplated by the present disclosure, including, without limitation, one or more polymers. The enclosure 204 may be configured to include one or more ports, busses, outlets, and/or access holes. For example, the enclosure 204 may include one or more switches communicatively coupled to one or more portions of the control unit (e.g., power switches). By way of another example, the enclosure 204 may include one or more holes through which one or more visual indicators (e.g., LED indicators) may be viewed by a user. The enclosure 204 may include a lid portion that may be hingedly attached to a body portion of the enclosure 204. The enclosure 204 may be removably coupled to the float 202 such that the enclosure 204 may be quickly removed from the float 202 (e.g., for replacement, storage, maintenance, and the like).

Figure 3A:
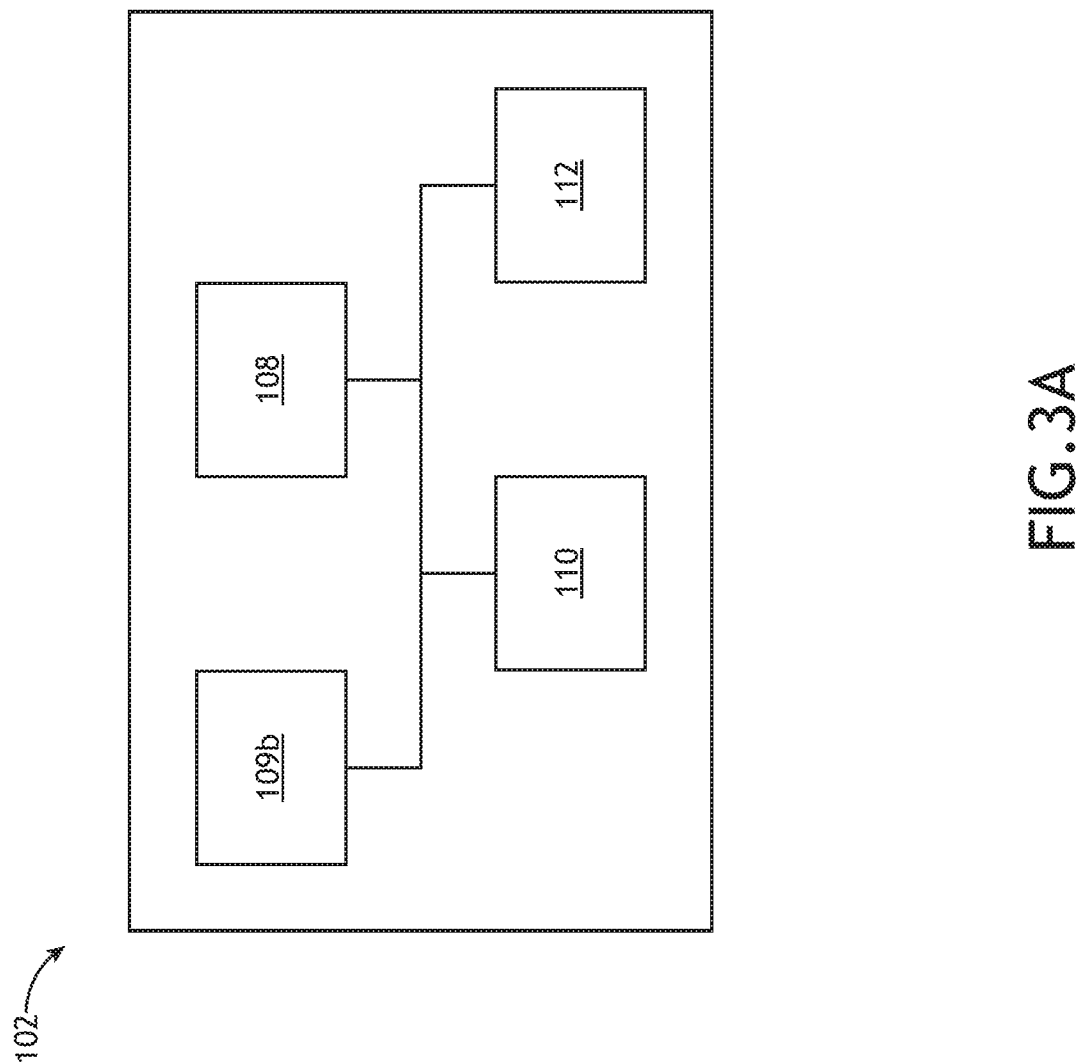
FIG. 3A illustrates a simplified block diagram of an electrical circuit of a base of a liquid level monitoring system, in accordance with one or more embodiments of the present disclosure.

FIG. 3A illustrates a simplified block diagram of an electrical circuit of the base 102. As previously described, the base 102 may include one or more processors 109b, a base GPS unit 108, one or more base communication circuits 110, and a base power source 112. Each of the foregoing components of the base 102 may be communicatively coupled to the various other components of the base 102 in any manner known in the art. For example, various components of the base 102 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

The base power source 112 may include any power supply known in the art including, but not limited to, one or more batteries, one or more battery packs, one or more energy-storing capacitors, and the like. It is contemplated herein that any power supply which is capable of long-lasting storage capabilities may be used in the base 102. It is contemplated herein that the base 102 may be configured to harvest and store electrical energy using one or more solar power systems.

Figure 3B:
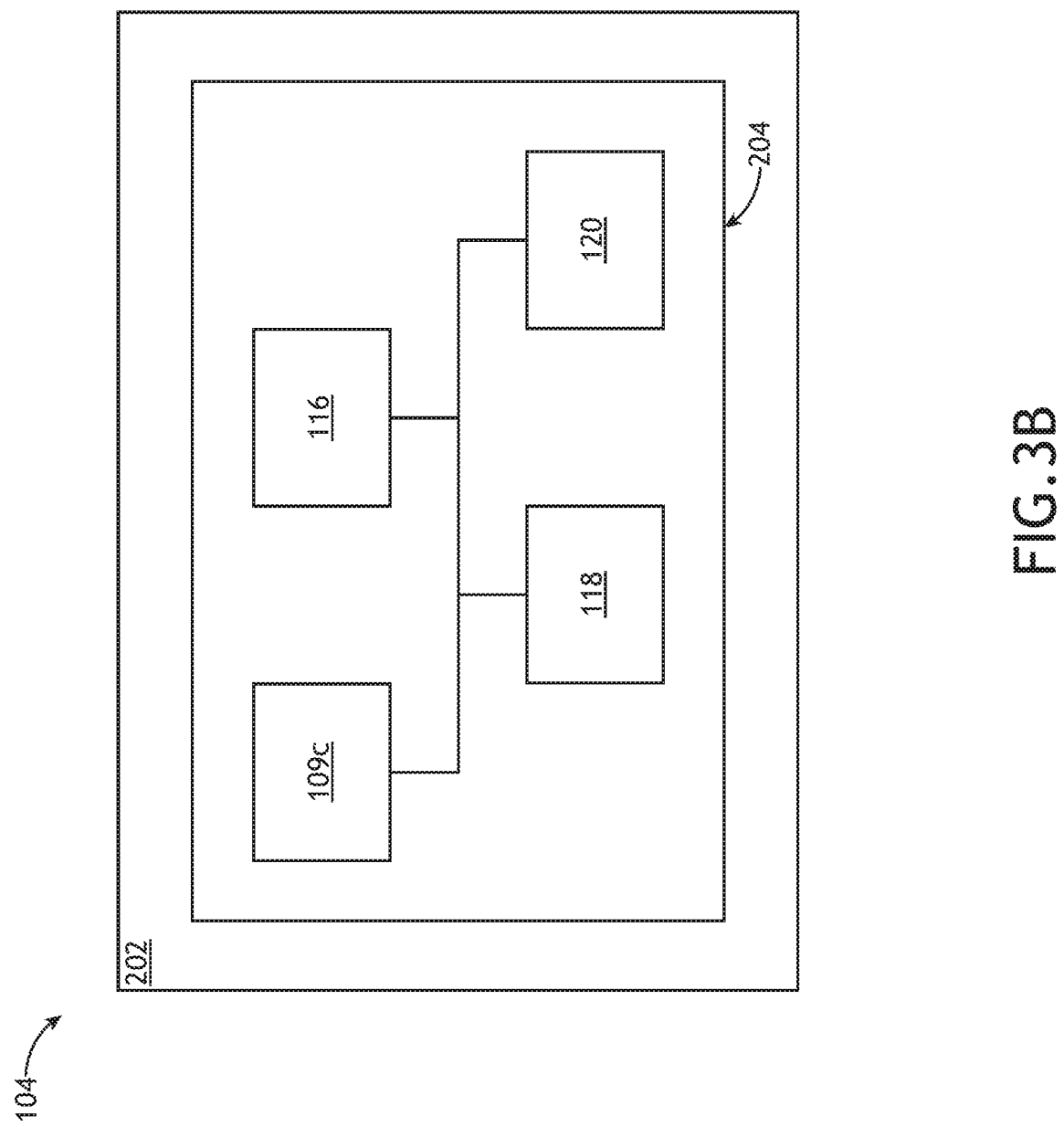
FIG. 3B illustrates a simplified block diagram of an electrical circuit of a rover of a liquid level monitoring system, in accordance with one or more embodiments of the present disclosure.

FIG. 3B illustrates a simplified block diagram of a rover 104. As previously described, the rover 104 may comprise a control unit housed within an enclosure 204. The control unit may include one or more processors 109c, a rover GPS unit 116, one or more rover communication circuits 118, and a rover power source 120. Each of the foregoing components of the base 102 may be communicatively coupled to the various other components of the base 102 in any manner known in the art. For example, various components of the base 102 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

The rover power source 120 may include any power supply known in the art including, but not limited to, one or more batteries, one or more battery packs, one or more energy-storing capacitors, and the like. It is contemplated herein that any power supply which is capable of long-lasting storage capabilities may be used in the one or more rovers 104. It is contemplated herein that the one or more rovers may be configured to harvest and store electrical energy using one or more solar power systems.

The one or more processors 109 may include any one or more processing elements known in the art. In this sense, the one or more processors 109 may include any microprocessor-type device configured to execute software algorithms and/or instructions. In one embodiment, the one or more processors 109 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 109a, 09b, or 109c. In general, the term "processor" may be broadly defined to encompass any device having one or more processing elements, which execute program instructions from memory. Moreover, different subsystems of the system 100 (e.g., base 102, the one or more rovers 104, the remote server 105, and the like) may include processor or logic elements suitable for carrying out at least a portion of the steps described throughout the present disclosure. Therefore, the above description should not be interpreted as a limitation on the present disclosure but merely an illustration.

It is noted that the various network components of system 100 (e.g., server 105, the data gateway, and the like) may include a network interface (not shown) configured to communicatively couple the various components to the network 107. The network interface may include any network interface circuitry or network interface device suitable for interfacing with network 107. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 4G LTE, 5G, 6G, WiFi protocols, RF, LoRa, and the like.

For purposes of the present disclosure, it is contemplated that the processing functions disclosed herein may be performed by any one or more of the or more processors 109. For example, any combination of the one or more processors 109*a*, 109*b*, or 109*c* may perform any portion of any of the processing functions described herein. It is specifically noted that, for purposes of the present disclosure, where an embodiment of the present disclosure describes a processor performing one or more processing functions, it is to be understood that such one or more processing functions may be performed by any combination of the one or more processors 109*a*, 109*b*, or 109*c*.

Figure 4:
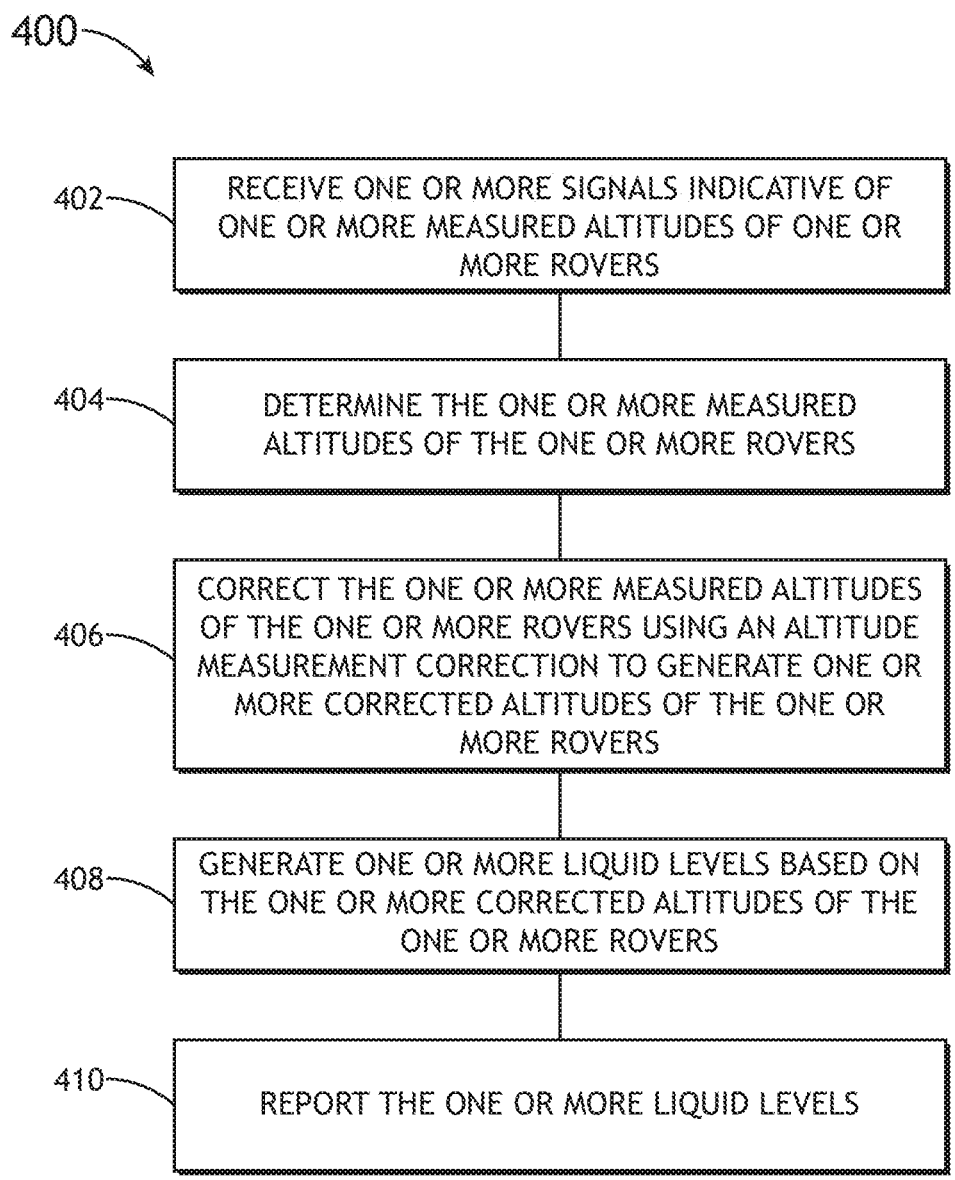
FIG. 4 illustrates a process flow diagram illustrating the steps of a method of liquid level monitoring, in accordance with one or more embodiments of the present disclosure.

FIG. 4 illustrates a process flow diagram illustrating the steps of a method of liquid level monitoring, in accordance with one or more embodiments of the present disclosure.

In Step 402, one or more signals indicative of one or more measured altitudes of one or more rovers are received. For example, the one or more processors 109 may receive from the rover GPS unit 116 one or more signals indicative of one or more measured altitudes of the one or more rovers 104. In some embodiments, the one or more rovers 104 may be configured to transmit (e.g., via the rover communication circuitry 118) the one or more signals indicative of the one or more measured altitudes of the one or more rovers to another component of the system 100 (e.g., to the one or more processors 109*a-b*) upon receipt by the rover GPS unit 116.

In Step 404, one or more measured altitudes of the measured rovers are determined. For example, the one or more processors 109 may determine the one or more measured altitudes of the one or more rovers 104 by analyzing and/or interpreting the one or more signals indicative of the one or more measured altitudes of the one or more rovers 104. In this regard, the one or more processors 109 may be configured to execute a set of program instructions to determine the one or more measured altitudes. It is specifically noted that the Step 404 may be performed by the one or more processors 109 located in any component of the system 100. For example, the one or more processors 109*a* located in the remote server 105 may perform the Step 404. By way of another example, the one or more processors 109*b* located in the base 102 may perform the Step 404. By way of another example, the one or more processors 109*c* located in the one or more rovers 104 may perform the Step 404.

In Step 406, the one or more measured altitudes are corrected using an altitude measurement correction to generate one or more corrected altitudes of the one or more rovers 104. For example, the one or more processors 109 may correct the one or more measured altitudes using the altitude measurement correction to generate the one or more corrected altitudes of the one or more rovers 104. As previously described, the altitude measurement correction may be determined based on an altitude measurement error. The altitude measurement error may be determined by comparing a measured altitude of the base 102 to a reference location of the base 102. While the embodiments of the present disclosure describe the determination of the altitude measurement error and the altitude measurement correction as being performed by the one or more processors 109*a*, it is specifically contemplated that the determination of the altitude measurement error and the altitude measurement correction, as well as the processing functions of the Step 406, may be performed by any one or more of the one or more processors 109*a*-109*c* located in any component of the system 100.

In Step 408, one or more liquid levels are generated based on the one or more corrected altitudes of the one or more rovers 104. For example, the one or more processors 109 may generate the one or more liquid levels by reference to one or more known characteristics of the body of liquid 111. By way of another example, the one or more processors 109 may generate the one or more liquid levels by associating the one or more corrected altitudes with one or more dimensions of the body of liquid (e.g., volume, width, depth, and the like) or with one or more known reference points provided by a user.

In Step 410, the one or more liquid levels are reported. For example, the one or more processors 109 may report the one or more liquid levels to the user interface. By way of another example, the one or more processors may alert a user of the one or more liquid levels.

While some of the embodiments of the present disclosure describe the liquid level monitoring system 100 in general terms, without limiting the generality of the present disclosure, it is specifically contemplated that the liquid level monitoring system 100 may be utilized, and its attendant advantages may be realized, in a variety of settings and industries.

For example, the liquid level monitoring system 100 may be implemented in a dam-level monitoring setting, wherein the one or more rovers 104 may be deployed on a body of liquid comprising water held in a reservoir contained by an earthen dam. In the foregoing example, the base 102 may be located on the earthen dam. The liquid level monitoring system 100 may be configured to determine and monitor one or more liquid levels of the water contained by the earthen dam.

By way of another example, the liquid level monitoring system 100 may be implemented in a natural lake, and may be configured to determine and monitor one or more liquid levels of the natural lake. The liquid level monitoring system 100 may be further configured to determine and/or monitor one or more aspects of water quality of the natural lake. For example, the one or more sensor units 122 may be configured to measure one or more aspects of water quality.

By way of another example, the liquid level monitoring system 100 may be implemented in an open-air effluent tank setting. For example, in an animal feeding operation, one or more rover 104 may be disposed on the surface of a large volume of effluent contained in a tank. The liquid level monitoring system 100 may be configured to determine and/or monitor one or more liquid levels of the effluent. By way of another example, the liquid level monitoring system 100 may be configured to provide one or more control signals to one or more additional systems (either upstream or downstream) based on the one or more liquid levels (e.g., one or more signals configured to start and/or stop a pump when the liquid level of the effluent reaches a certain value).

By way of another example, the liquid level monitoring system 100 may be implemented in any setting in which information regarding a rate of fill and/or a rate of drain with respect to a body of liquid is desired. For example, the liquid level monitoring system 100 may be configured to continuously determine one or more liquid levels of a body of liquid (e.g., determine one or more liquid levels at regular periods of time), and to calculate one or more rates at which the liquid levels change over time. The system 100 may be configured to determine one or more changes in a volume of the body of liquid based on the one or more rates at which the liquid levels change over time.

It is noted that the foregoing embodiments of the present disclosure are not limited to the settings, contexts, and applications in which they have been described. For example, the applications and examples of the present disclosure may be interchangeable between settings and contexts, and are provided merely for illustrative purposes.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. As described herein, memory may include any storage medium known in the art suitable for storing program instructions executable by the associated one or more processors 109. For example, the memory may include a non-transitory memory medium. For instance, the memory may include, but is not limited to, a read-only memory (ROM), a random-access memory (RAM), a magnetic or optical memory device (e.g., disk), a magnetic tape, a solid-state drive and the like. In another embodiment, the memory is configured to store data collected by the base 102 and/or the one or more rovers 104. It is further noted that memory may be housed in a common controller housing with the one or more processors 109. In an alternative embodiment, the memory may be located remotely with respect to the physical location of the processors 109. In another embodiment, the memory maintains program instructions for causing the one or more processors 109 to carry out the various steps described through the present disclosure.

The base GPS unit 108 and the rover GPS unit 116 (for purposes of this paragraph, the "GPS units") may be configured to receive global navigation satellite signals, including, without limitation, global position information from a global position system (e.g., GPS, GNSS, GLONASS and the like). In this regard, the GPS units may be configured to receive GPS data regarding the position, location, and altitude of one or more components of the system 100. It is noted herein that the GPS units and may include any communication circuitry known in the art, including receivers, transmitters, transceivers, and the like.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A liquid level monitoring system, comprising:
    one or more rovers configured for placement on a surface of a body of liquid, wherein the one or more rovers comprise:
        a rover global positioning system unit;
        one or more rover communication circuits; and
        a rover power source;
    a base configured for fixed placement on land, wherein the base comprises:
        a base global positioning system unit;
        one or more base communication circuits; and
        a base power source; and
    one or more processors configured to:
        receive one or more signals indicative of one or more measured altitudes of the one or more rovers;
        determine one or more measured altitudes of the one or more rovers;
        generate one or more corrected altitudes of the one or more rovers by correcting the one or more measured altitudes of the one or more rovers using an altitude measurement correction, wherein the altitude measurement correction is performed by receiving one or more signals indicative of a measured altitude of the base positioned at a location having a reference altitude; determining the measured altitude of the base based on the one or more signals indicative of a measured altitude of the base; comparing the measured altitude of the base to the reference altitude of the base to determine an altitude measurement error; and providing an altitude measurement correction based on the altitude measurement error;
        determine one or more liquid levels based on the one or more corrected altitudes of the one or more rovers; and
        provide one or more control signals to control a pump based on the determined one or more liquid levels to control a volume of the body of the liquid.

2. The liquid level monitoring system of claim 1, wherein the reference altitude is determined by reference to one or more sets of geographical coordinates corresponding to the location having the reference altitude.

3. The liquid level monitoring system of claim 1, wherein the comparing the measured altitude of the base to the reference altitude to determine an altitude measurement error comprises computing a difference between the reference altitude and the measured altitude.

4. The liquid level monitoring system of claim 1, wherein the one or more rovers are configured to receive the one or more signals indicative of one or more measured altitudes of the one or more rovers and to use real-time kinematics positioning and navigation to determine the one or more measured altitudes of the one or more rovers.

5. The liquid level monitoring system of claim 1, wherein the base is configured to receive the one or more signals indicative of a measured altitude of the base and to use real-time kinematics positioning and navigation to determine the measured altitude of the base.

6. The liquid level monitoring system of claim 1, wherein the one or more base communication circuits comprise at least one of one or more radio frequency (RF) transceiver units or one or more cellular communication units.

7. The liquid level monitoring system of claim 1, wherein the one or more rover communication circuits comprise at least one of one or more radio frequency (RF) transceiver units or one or more cellular communication units.

8. The liquid level monitoring system of claim 1, wherein the one or more rovers include one or more sensor units configured to measure one or more characteristics of the body of liquid.

9. The liquid level monitoring system of claim 8, wherein the one or more sensor units comprise at least one of a radar sensor, a sonar sensor, a camera, or a chemical sensor.

10. The liquid level monitoring system of claim 1, wherein the one or more rovers include one or more drive systems.

11. The liquid level monitoring system of claim 10, wherein the one or more drive systems comprise one or more propellers.

12. The liquid level monitoring system of claim 1, wherein the body of liquid comprises at least one of a pond, a lake, a lagoon, a canal, a stream, a river, a reservoir, or a man-made body of water.

13. The liquid level monitoring system of claim 1, wherein the one or more processors are located in at least one of the one or more rovers.

14. The liquid level monitoring system of claim 1, wherein the one or more processors are located in the base.

15. The liquid level monitoring system of claim 1, wherein the one or more processors are located in a remote server communicatively coupled to at least one of the base or the one or more rovers.

16. A rover apparatus, comprising:
a float;
a control unit communicatively couplable to a base, wherein the control unit comprises:
a global positioning system unit configured to receive one or more signals indicative of a measured altitude of the float;
one or more rover communication circuits;
a rover power source; and
one or more rover processors configured to:
determine a corrected altitude of the float, wherein the altitude corrected altitude of the float is generated by receiving one or more signals indicative of a measured altitude of the base positioned at a location having a reference altitude; determining the measured altitude of the base based on the one or more signals indicative of a measured altitude of the base; comparing the measured altitude of the base to the reference altitude of the base to determine an altitude measurement error; and providing an altitude measurement correction based on the altitude measurement error;
determine one or more liquid levels based on the corrected altitude of the float; and
provide one or more control signals to control a pump based on the determined one or more liquid levels to control a volume of the body of the liquid.

17. The rover apparatus of claim 16, wherein the rover apparatus is configured to receive the one or more signals indicative of a measured altitude of the rover apparatus and to use real-time kinematics positioning and navigation to determine the measured altitude of the rover apparatus.

18. The rover apparatus of claim 16, wherein the rover apparatus includes one or more sensor units configured to measure one or more characteristics of the body of liquid.

19. The rover apparatus of claim 18, wherein the one or more sensor units comprise at least one of a radar sensor, a sonar sensor, a camera, or a chemical sensor.

20. The rover apparatus of claim 16, wherein the rover apparatus includes one or more drive systems.

21. The rover apparatus of claim 20, wherein the one or more drive systems comprise one or more propellers.

22. The rover apparatus of claim 16, wherein the body of liquid comprises at least one of a pond, a lake, a lagoon, a canal, a stream, a river, a reservoir, or a man-made body of water.

23. The rover apparatus of claim 16, wherein the one or more rover processors are located on the one or more rovers.

24. The rover apparatus of claim 16, wherein the one or more rover processors are located in a remote server communicatively coupled to the rover apparatus.

25. The rover apparatus of claim 16, wherein the base is configured for fixed placement on land, and wherein the base comprises:
a base global positioning system unit configured to receive one or more signals indicative of a measured altitude of the base;
one or more base processors configured to determine one or more corrected altitudes of the of the base;
one or more base communication circuits; and
a base power source.

26. The rover apparatus of claim 25, wherein the base is configured to receive the one or more signals indicative of a measured altitude of the base and to use real-time kinematics positioning and navigation to determine the measured altitude of the base.

27. The rover apparatus of claim 26, wherein the one or more base communication circuits comprise at least one of one or more radio frequency (RF) transceiver units or one or more cellular communication units.

28. The rover apparatus of claim 25, wherein the one or more base processors are located in the base.

29. The rover apparatus of claim 25, wherein the one or more base processors are located in a remote server communicatively coupled to the base.

30. A method of liquid level monitoring, comprising:
receiving one or more signals indicative of one or more measured altitudes of one or more rovers disposed on a surface of a body of liquid;
determining the one or more measured altitudes of the one or more rovers;
correcting the one or more measured altitudes of the one or more rovers using an altitude measurement correction to generate one or more corrected altitudes of the one or more rovers, wherein the altitude measurement correction is performed by receiving one or more signals indicative of a measured altitude of the base positioned at a location having a reference altitude; determining the measured altitude of the base based on the one or more signals indicative of a measured altitude of the base; comparing the measured altitude of the base to the reference altitude of the base to determine an altitude measurement error; and providing an altitude measurement correction based on the altitude measurement error;
determining one or more liquid levels based on the one or more corrected altitudes of the one or more rovers; and
providing one or more control signals to control a pump based on the determined one or more liquid levels to control a volume of the body of the liquid.

31. The altitude measurement correction generation method of claim 30, wherein the comparing the measured altitude of the based to the reference altitude to determine an altitude measurement error comprises computing a difference between the reference altitude and the measured altitude.

32. A liquid level monitoring system, comprising:
one or more rovers configured for placement on a surface of effluent, wherein the one or more rovers comprise:
a rover global positioning system unit;
one or more rover communication circuits;
a rover power source;
a base configured for fixed placement on land, wherein the base comprises:
a base global positioning system unit;
one or more base communication circuits; and
a base power source; and
one or more processors configured to:
receive one or more signals indicative of one or more measured altitudes of the one or more rovers;
determine one or more measured altitudes of the one or more rovers;
generate one or more corrected altitudes of the one or more rovers by correcting the one or more measured altitudes of the one or more rovers using an altitude measurement correction, wherein the altitude measurement correction is performed by receiving one or more signals indicative of a measured altitude of the base positioned at a location having a reference altitude; determining the measured altitude of the base based on the one or more signals indicative of a measured altitude of the base; comparing the measured altitude of the base to the reference altitude of the base to determine an altitude measurement error; and providing an altitude measurement correction based on the altitude measurement error;

determine one or more liquid levels of the effluent based on the one or more corrected altitudes of the one or more rovers; and provide one or more control signals to control a pump based on the determined one or more liquid levels to control a volume of the effluent.

33. A liquid level monitoring system, comprising:
one or more rovers configured for placement on a surface of a body of liquid, wherein the one or more rovers comprise:
  a rover global positioning system unit;
  one or more rover communication circuits;
  one or more rover processors configured to provide one or more signals indicative of one or more measured altitudes of the one or more rovers; and
  a rover power source; and
a base configured for fixed placement on land, wherein the base comprises:
  a base global positioning system unit;
  one or more base processors configured to determine an altitude measurement error and to generate an altitude measurement correction based on the altitude measurement error;
  one or more base communication circuits communicatively couplable with the one or more rover communication circuits, wherein the one or more base communication circuits are configured to provide the altitude measurement correction; and
  a base power source; and
a remote server communicatively couplable to at least one of the one or more rover communication circuits or the one or more base communication circuits, wherein the remote server comprises one or more processors configured to:
  receive one or more signals indicative of one or more measured altitudes of the one or more rovers;
  determine one or more measured altitudes of the one or more rovers;
  generate one or more corrected altitudes of the one or more rovers by correcting the one or more measured altitudes of the one or more rovers using the altitude measurement correction, wherein the altitude measurement correction is performed by receiving one or more signals indicative of a measured altitude of the base positioned at a location having a reference altitude; determining the measured altitude of the base based on the one or more signals indicative of a measured altitude of the base; comparing the measured altitude of the base to the reference altitude of the base to determine an altitude measurement error; and providing an altitude measurement correction based on the altitude measurement error;
  determine one or more liquid levels based on the one or more corrected altitudes of the one or more rovers; and
  provide one or more control signals to control a pump based on the determined one or more liquid levels to control a volume of the body of the liquid.

* * * * *